(12) United States Patent
Haspel et al.

(10) Patent No.: US 6,832,799 B2
(45) Date of Patent: Dec. 21, 2004

(54) LOADING COMPARTMENT FOR A MOTOR VEHICLE

(75) Inventors: Kalus Haspel, Rottenburg (DE); Thomas Seeg, Ostfildern (DE); Werner P. Schlecht, Vaihingen/Enz (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/332,014

(22) PCT Filed: Jul. 3, 2001

(86) PCT No.: PCT/EP01/07599

§ 371 (c)(1),
(2), (4) Date: May 19, 2003

(87) PCT Pub. No.: WO02/02372

PCT Pub. Date: Jan. 10, 2002

(65) Prior Publication Data

US 2004/0217616 A1 Nov. 4, 2004

(30) Foreign Application Priority Data

Jul. 5, 2000 (DE) .......................................... 100 32 706
Jul. 22, 2000 (DE) .......................................... 100 47 541

(51) Int. Cl.$^7$ .................................................. B60R 7/04
(52) U.S. Cl. .................... 296/37.16; 296/37.8; 224/539

(58) Field of Search ............................. 296/37.8, 37.16, 296/37.13, 152; 224/539, 542, 543, 928

(56) References Cited

U.S. PATENT DOCUMENTS

| | | | | |
|---|---|---|---|---|
| 1,556,353 A | * | 10/1925 | Roedding | 296/37.8 |
| 1,625,011 A | * | 4/1927 | Wolfe et al. | 224/281 |
| 3,326,596 A | | 6/1967 | Spina | 296/37 |
| 4,705,317 A | * | 11/1987 | Henri | 224/543 |
| 4,911,296 A | | 3/1990 | Hart, Jr. | 206/373 |
| 5,823,599 A | * | 10/1998 | Gray | 296/37.8 |
| 5,855,310 A | * | 1/1999 | Van Ert et al. | 296/37.13 |
| 5,951,085 A | | 9/1999 | Fukatsu | 296/37.8 |
| 6,196,605 B1 | * | 3/2001 | Baldas et al. | 296/37.13 |
| 2004/0020957 A1 | * | 2/2004 | Poliquin et al. | 224/543 |
| 2004/0094985 A1 | * | 5/2004 | Mobley | 296/37.6 |

* cited by examiner

Primary Examiner—Lori L. Coletta
(74) Attorney, Agent, or Firm—Greenberg Traurig

(57) ABSTRACT

A loading compartment comprising a loading compartment base (2), in addition to two opposing lateral walls (3) is known in prior art. According to the invention, at least one lateral wall (3) comprising at least one dimensionally stable functional module (4a–4d) is provided. Said module is detachably mounted to the bodywork and has an open or closed receiving compartment for at least one functional element (5a–5d). The invention can used in estate vehicles.

17 Claims, 5 Drawing Sheets

Figure 1:
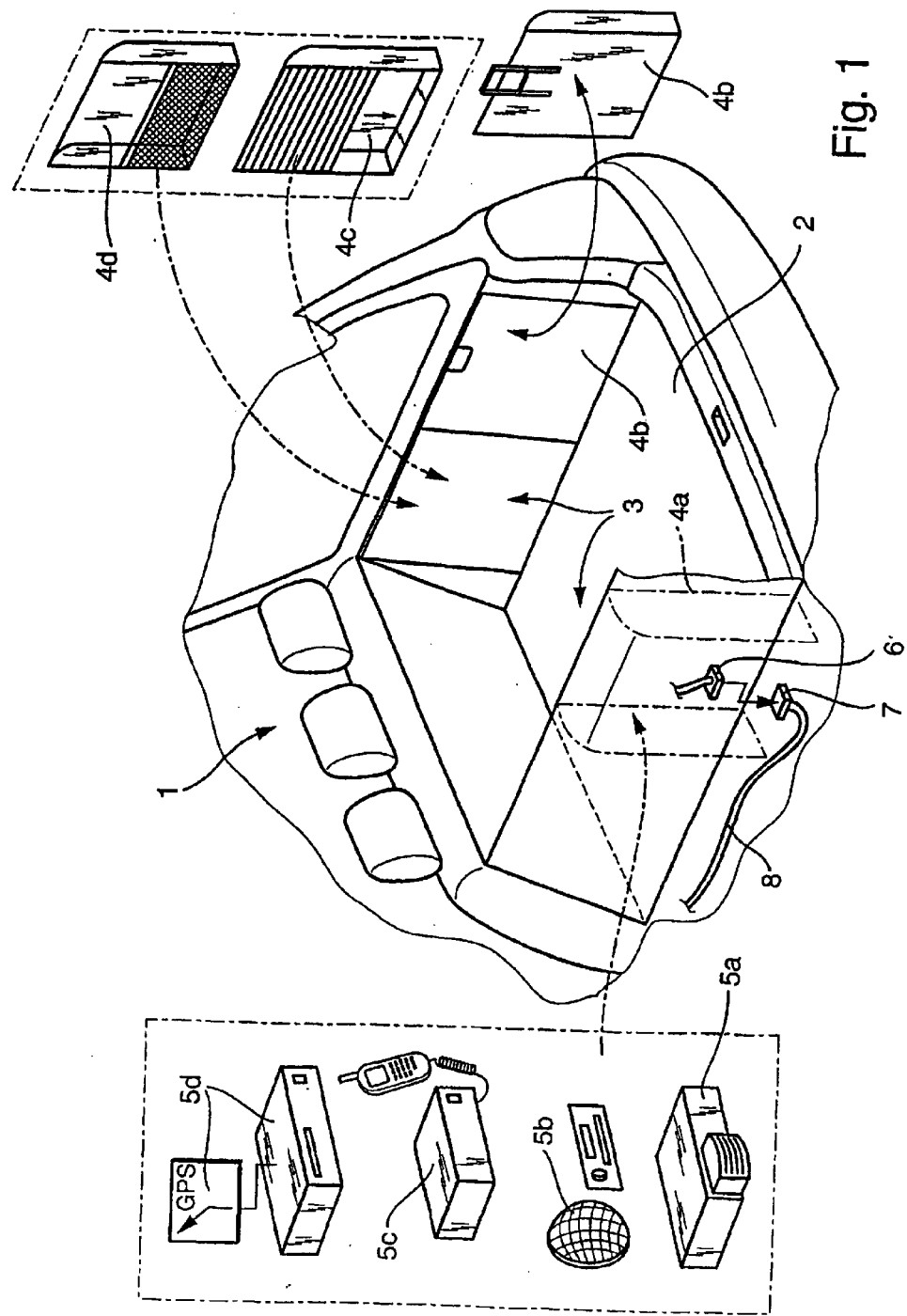

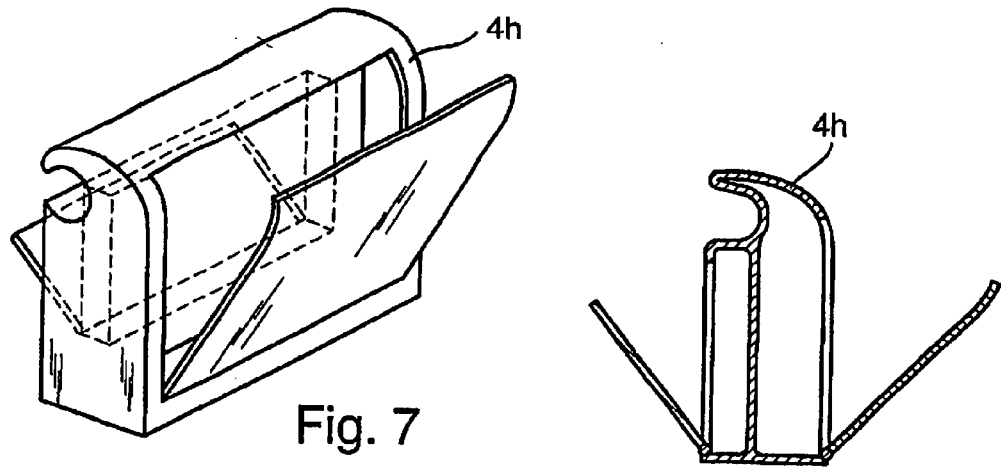
Fig. 7
Fig. 8
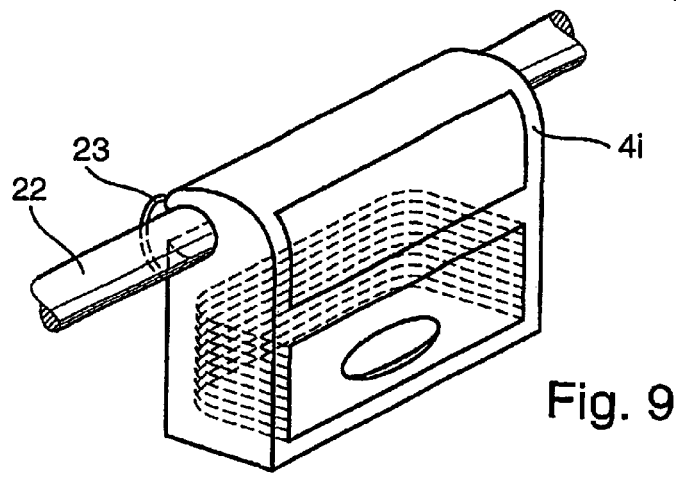
Fig. 9
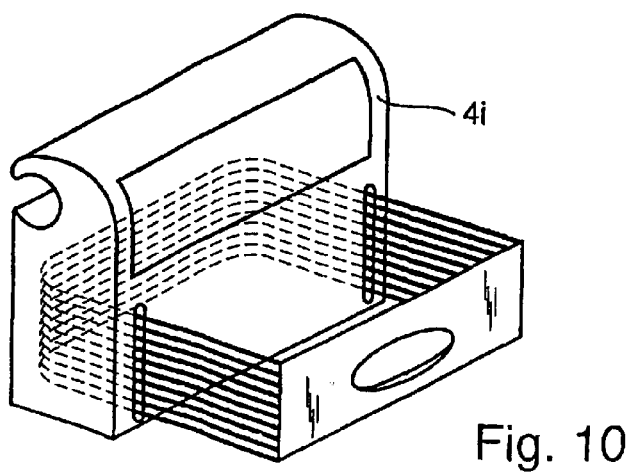
Fig. 10

LOADING COMPARTMENT FOR A MOTOR VEHICLE

The invention relates to a loading or luggage compartment of a motor vehicle with a loading compartment base, as well as with two facing side walls.

Such loading compartments are generally known for estate cars or station wagons, as well as large capacity limousines. The side walls of the loading compartments in individually designed and matched to the given vehicle body circumstances. The side walls of the loading compartments are formed by inside panel parts. Behind the side panels functional parts are fixed to the body such as first-aid kits, tool kits, CD players, navigational instruments or the like. In order to allow access from the loading compartment to said functional parts, parts of the side panels are removable.

The problem of the invention is to provide a loading compartment of the aforementioned type, which can be structured in variable manner.

This problem is solved in that at least one side wall is provided with at least one dimensionally stable functional module, which is held in detachable manner on the body side and which has an open or closed reception space for at least one functional part. The functional module is integrated into the side wall. If there are several functional modules, the particular side wall of the loading compartment can be created over its entire length, considered in the vehicle longitudinal direction, by the functional modules. An essential advantage of the solution according to the invention is that directly on the functional module is provided a corresponding reception space for at least one functional part, so that the latter can be preassembled prior to the installation of the functional module. Body-side receptacles or holding means for corresponding functional parts do not have to be provided, so that in accordance with the wishes of the customer, a corresponding loading compartment can be individually designed and structured even in the finished state of the vehicle without it being necessary to provide for this purpose body or carcass-side measures. The reception space can be subdivided by corresponding bases or wall sections into several individual areas. Loading compartments in the sense of the invention are both boots/trunks of cars and loading compartments of station wagons and large-capacity limousines.

The functional parts can be both technical modules such as CD players, navigational devices, sound systems or other electrical or electronic components, as well as first-aid kits, tool kits, warning triangles, tow cables, starter cables and the like. However, the functional parts may not belong to the vehicle, but are stowed in an appropriate manner in the vehicle. Thus, the functional parts also include holding containers with openable or closable areas, other types of storage or holding containers, leisure and hobby accessories and the like.

According to a development of the invention at least one end face of the functional module is provided with a panel, which is matched to the remaining panel surface of the loading compartment. As a result the functional module can be optically incorporated into the vehicle interior design. Matching can be brought about in that the same material is chosen for the panel as for the remaining panel surface. Alternatively matching can also be brought about by an optical and/or haptic adaptation using differently designed materials or surfaces.

According to another development of the invention the functional module is designed as a container open on at least one side. The functional module can have a shell, tub or box-shaped design. It can in particular merely be formed by an end wall directed towards the loading compartment and an individual side wall. In this case the closed reception space then results from the adjacent wall sections of the side wall or body, as soon as the functional module is in its vehicle-fixed state mounted on the body.

According to another development of the invention the functional module is designed as a closed, box-shaped container. Preferably said container has a lid or cover to permit filling and emptying thereof. Preferably the container is provided with at least one carrying handle to permit transportation outside the vehicle.

According to another development of the invention the functional module has at least one plug-in connection for the detachable connection with the vehicle-fixed, electrical connecting leads. This design is particularly advantageous if the functional module is provided with electrical or electronic functional parts, because they can be connected in a preassembly stage to the functional module-side plug-in connection, which can then be connected to the vehicle-side connecting leads on inserting the functional module into the vehicle.

According to another development of the invention on the loading compartment side there is a corresponding linking junction, which forms a connector pair with the plug-in connection when the functional module is installed. The loading compartment-side, i.e. body-side linking junction is preferably positioned in such a way that automatically on inserting the functional module the connector pair is formed with the functional module-side plug-in connection. For this purpose the plug-in connection is appropriately arranged and fastened to the functional module in order to necessarily obtain the connector pair with the linking junction on inserting the functional module.

According to another development of the invention the functional module is fixed in the loading compartment by means of a positively active, manually releasable holder. This makes it possible to install and remove the functional module without using tools. The positive design of the holder ensures a crashproof fixing of the functional module in the vehicle.

According to a further development of the invention in the vicinity of a side wall are provided at least two interconnected functional modules, which in aligned manner have end faces directed towards the loading compartment interior. This makes it possible to use the free space between the side wall and the body side for positioning functional parts. The functional modules can also extend over the entire length of the loading compartment side wall, so that the functional modules with their end wall directed towards the loading compartment form the side wall for said loading compartment.

According to another development of the invention on the body side there is at least one fixed bulkhead partition extending in the vehicle transverse direction, which laterally flanks a functional module or is positioned between two adjacent functional modules. Such bulkhead partitions can bring about a support of the functional module behind the same in the direction of travel. They can also constitute side walls for functional modules open to this side. They can finally be provided with holding or fastening means in order to permit the fastening of the functional modules.

According to another development of the invention the container has at least one carrying handle, which additionally serves as a control element for the manually releasable holding of the container in the loading compartment. Thus, the carrying handle has a double function, in that it serves both for the carrying of the container and also the installation and removal of the container, i.e. the functional module with respect to the loading compartment.

According to a further development of the invention on the functional module is provided at least one functional track directed towards the loading compartment interior and which fulfils fixing, holding or contacting functions. In the functional track can be provided sockets for the connection of electrical appliances such as vacuum cleaners or the like, which are energized by the vehicle power supply. In addition, the functional track can be used for fixing segmenting or covering units for the loading compartment. The functional tracks can also receive fixing means, such as hooks or rings, which are provided for the occasional holding of transported articles.

According to another development of the invention in vehicle-fixed manner in the vicinity of at least one interior surface is provided at least one functional track, which flanks in bounding manner at least one functional module and/or takes over fixing, holding or contacting functions. Preferably a corresponding functional track is in the form of a metal rail section.

According to another development of the invention the holder is constituted by a retaining means and a locking unit spaced from said retaining means and combined therewith. Preferably the retaining means and locking unit are matched to one another in such a way that the functional module initially on one side and in the tilted state is introduced into the retaining means and subsequently by simply tilting into the functional position releases the locking unit, so that automatically on tilting the vehicle-fixed locking and securing of the functional module can be brought about.

According to a further development of the invention with the functional module is associated a restraining device, which holds the functional module in position in the case of vehicle impact stresses. Such a restraining device can be obtained by frame or support parts. In the same way it is possible to obtain a restraining device by the use of steel cables, chains or similar flexible restraining means.

According to yet another development of the invention the holder for the functional module has energy absorption means, which retain the functional module. Thus, in the case of a vehicle impact, by means of the energy absorption means in the holder impact energy is preferably converted into strain energy, so that stresses on the functional module are reduced. Thus, even in the case of vehicle impact stresses, a reliable retention of the functional module in the vehicle interior is ensured.

Further advantages and features of the invention can be gathered from the claims and the following description of preferred embodiments of the invention with reference to the attached drawings, wherein show:

FIG. 1 An embodiment of a loading compartment according to the invention in a perspective view with different, alternatively usable functional modules and functional parts.

Figure 2:
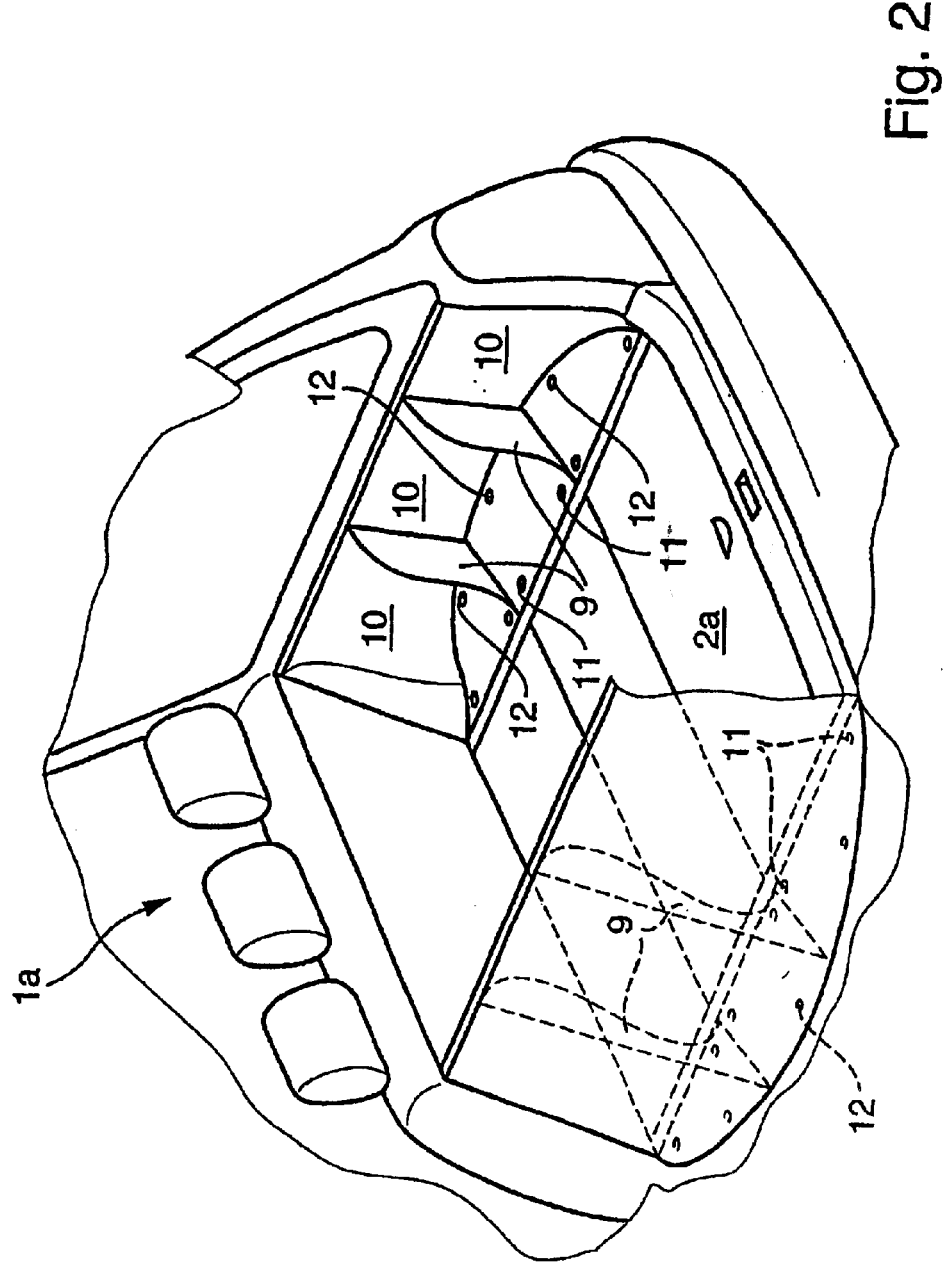

FIG. 2 A loading compartment similar to FIG. 1 without inserted functional module.

Figure 3:
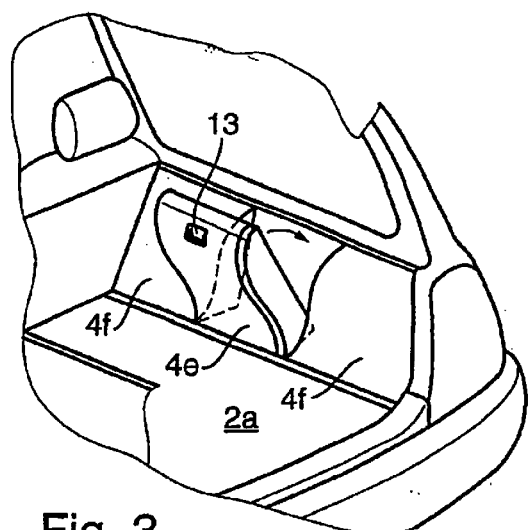

FIG. 3 The loading compartment of FIG. 2 with inserted functional modules.

Figure 4:
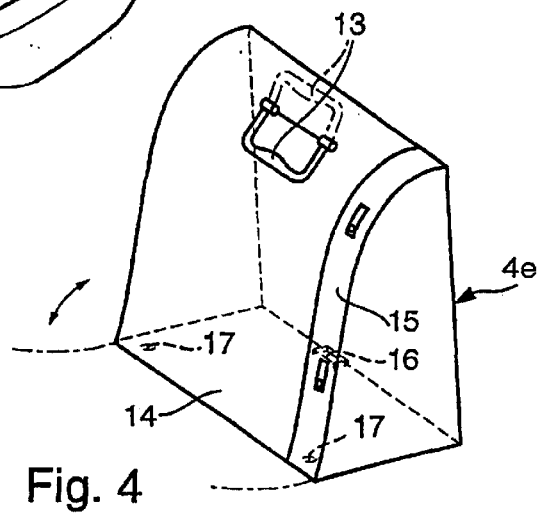

FIG. 4 A larger scale, perspective view of a functional module for the loading compartment according to FIGS. 2 and 3.

Figure 5:
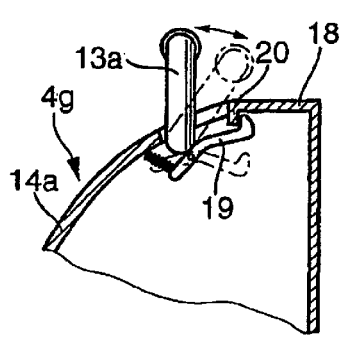

FIG. 5 A larger-scale sectional representation of an upper area of a functional module similar to FIG. 4, where a carrying handle additionally serves as a control element for the body-side fixing of the functional module.

Figure 6:
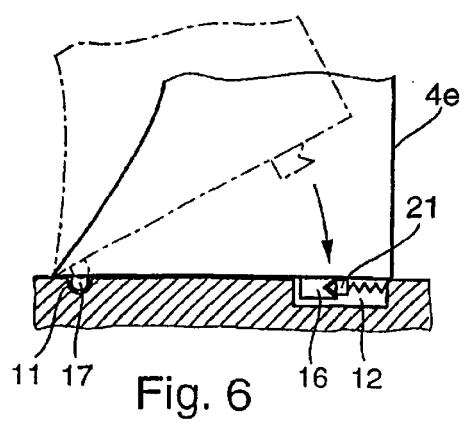

FIG. 6 A sectional representation of the base region of the functional module according to FIG. 4 showing the vehicle-side fixing.

FIG. 7 Diagrammatically a functional module with two stowing areas, which are accessible from opposite sides.

FIG. 8 A sectional representation of the functional module according to FIG. 7.

FIG. 9 A further functional module similar to FIG. 7, where a reception container is designed as a drawer.

FIG. 10 The functional module according to FIG. 9 with the drawer open.

Figure 11:
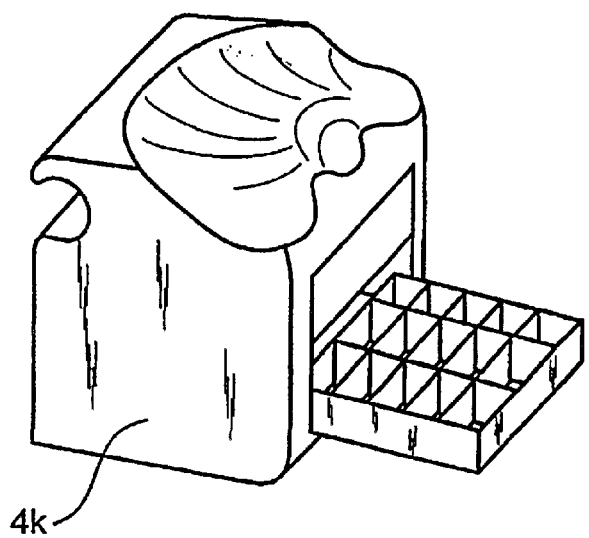

FIG. 11 A functional module in the form of a leisure module.

Figure 12:
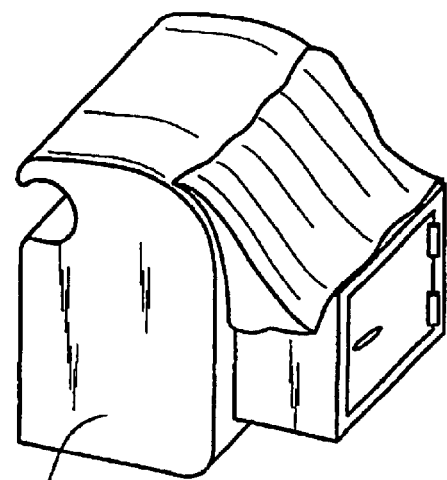

FIG. 12 A functional module for receiving a refrigerator.

Figure 13:
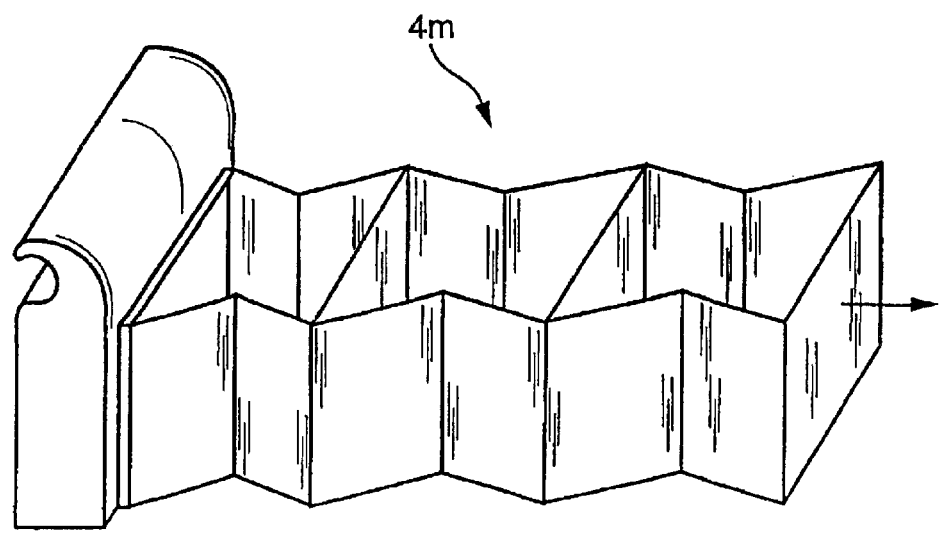

FIG. 13 A further functional module provided with a fold-up, flexible stowing container.

A loading compartment 1 for a station wagon has a loading compartment base 2 and on facing vehicle sides in each case a side wall 3 which, as desired, can be provided with different functional modules 4a, 4b, 4c, 4d. Thus, the side walls 3 constitute panels for the lateral body parts not visible in FIG. 1.

In FIG. 2 in the loading compartment 1a, which also constitutes a loading compartment of a car, the side wall is open, so that it is possible to view the lateral body parts 10. Functional modules 4a to 4d concealing the body side parts 10 and which can represent the inner side wall boundary for the loading compartment 1 have been removed in this construction. However, on the body side on the opposite sides are in each case two vertical bulkhead partitions 9 oriented in the vehicle transverse direction and fixed on the vehicle and body side. The bulkhead partitions 9 subdivide the facing sides of the loading compartment 1a into three equally wide portions, into which can in each case be inserted a functional module. The insertion of such a functional module 4e, 4f, 4g is described hereinafter relative to FIGS. 3 to 6.

Each functional module 4a to 4g is a dimensionally stable structure having an open or closed reception space. On the vehicle side each functional module 4a to 4g is directly or indirectly connected to the vehicle body. For this purpose both on the functional module 4e, 4g and on the vehicle side there are corresponding fixing means 11, 12, 16, 17, 19, 20, which ensure a positive fixing of the functional module 4a to 4g in the vehicle. As positive holders are provided according to FIGS. 2 and 4, as well as FIG. 6 base-side fixing means, which are formed by two holding receptacles 11 at the front towards the vehicle centre in a lateral area of the loading compartment base 2a and corresponding centring studs 17 on the undersides of the functional modules 4e, as well as a locking block 16 located further to the rear relative to the vehicle centre on the underside of the functional module 4e and a corresponding locking receptacle 12. In the locking receptacle 12 is provided a spring-loaded locking bolt 21, which is matched to the dovetail profile of the locking block 16 in such a way that on inserting said block it initially presses back and is then pressed by spring tension into the dovetail recess. In the inserted state the functional module 4e is positioned flush between the bulkhead partitions 4 and terminates flush with its end wall projecting into the loading compartment 2a and is aligned with the leading edges of the bulkhead partitions 9. The adjacent functional modules 4f (FIG. 3) are preferably inserted in the same way as the fictional module 4e and have correspondingly designed end walls, which provide a common alignment. Thus, by means of said end walls a through side wall for the loading compartment 2a is created. The end walls 14 (FIG. 4) are preferably aligned in such a way that they are matched to the interior design.

In the embodiment of FIG. 5 a slightly modified functional module 4g is provided, whose rear wall is formed by body-side wall and profile sections 18, so that the functional module 4g has in its state removed from the side wall a tub or shell shape. Holding in the vicinity of the base of the functional module 4g can also be brought about by positive centring or locking connections. Additionally in the upper area of the functional module 4g according to FIG. 5 is provided a further, manually releasable locking means, which is formed by a locking hook 19 on functional module 4g, which engages behind a profile web of the wall and profile section 18. The wall and profile section 18 is fixed to the body, which ensures a reliable retention of the functional module 4g in the installed state. The locking hook 19 is connected in one piece to the carrying handle 13a of the functional module 4g, as can be seen in FIG. 5. By rearwardly pressing the carrying handle 13a, the locking hook 19 can be released from the profile web 20, so that the functional module 4g can be removed to the front, i.e. towards the middle of the loading compartment.

The functional modules 4a to 4g can be joined to the corresponding body side parts laterally of the loading compartment base 2, 2a and consequently form at least zonally the side walls 3 of loading compartment 1, 1a. According to FIGS. 1 to 3 several functional modules 4a to 4g can be juxtaposed, so that together they form the side wall for the loading compartment 1, 1a. However, it is also possible to recess the side wall 3 for the reception of only a single functional module. The remaining panel parts of the side wall are then designed in fixed manner. Different constructions of functional modules 4a to 4g are shown in FIGS. 1, 3, 4 and 5. As is apparent from FIG. 1, functional modules 4c and 4d can be constructed in tub-shaped manner in such a way that they are open towards the middle of the loading compartment, said open area being at least zonally closable by closing parts such as a holding net, a sliding window shade or the like. With respect to the functional module 4b a double-shell container can be provided, which has a carrying handle and where both dimensionally stable shells can be unfolded and joined together in the manner of a suitcase.

In the case of the functional module 4a the reception space therein is intended for holding and fixing technical functional parts 5a to 5d, such as in particular a CD player, a sound system, a telecommunications box or a navigational device. For this purpose the functional module 4a is already provided with a prepared plug-in connection 6, to which can be connected the leads of electrical or electronic functional parts 5a to 5d. The plug-in connection 6 corresponds to a vehicle-side linking junction 7, which by means of corresponding connecting leads 8, creates the connection with the power supply of the vehicle and corresponding vehicle-side, electronic control components. The plug-in connection 6 of the functional module 4a can be fixed to a base of the latter in such a way that necessarily on inserting the functional module 4a a connector pair is obtained with the vehicle-side linking junction 7. In the same way said connector pair is released again on removing the functional module 4a from the vehicle. This makes it possible to preassemble the necessary technical functional parts in the functional module 4a, so that there is no need for vehicle-side fastenings for said functional parts, such as are provided in the prior art.

In the vicinity of the end wall 14 of functional module 4e is laterally provided a functional track 15, which is provided with not further specified holding slots for hanging in fixing hooks or the like. In said fixing slots can also be held segmenting units for the loading compartment.

A functional module 4h according to FIGS. 7 and 8 is designed as a dimensionally stable reception container, which both at the front and back is provided with in each case one stowing space. The front stowing space can be closed by a larger cover and the rear stowing space by a smaller cover. Both covers are pivotably arranged in the vicinity of a reception container base. In an upper area the functional module 4h is provided at the rear with a gripping depression passing over the entire width and which apart from the gripping function also takes over the retention function for the functional module 4h. For this purpose and corresponding to the embodiment in FIG. 9, for the functional module 4i is provided a vehicle-fixed restraining profile 22, with which the functional module 4h and also the functional module 4i can be positively connected by means of a not shown holder. There is also a restraining means 23 designed as an energy absorption means. The restraining means is formed by a flexible steel cable 23, which is fixed to the functional module 4h, 4i and in the installed state engages round the restraining profile 22. The restraining means can as an energy absorption means be provided with a metal mesh or a force limiter or some differently designed, plastically deformable part. In the case of the functional module according to FIGS. 9 and 10 the stowing space is constituted by a frame which can be pulled out like a drawer and which is shown in FIG. 10 in its opened state. The frame can also be provided with a base, so that it has a full drawer function.

In the embodiment according to FIG. 11a functional module 4k is provided, which is designed as a hobby or leisure accessory. The functional module 4k more particularly constitutes an angling or fishing module and on the front thereof are provided drawers for fishing requisites. A seat is provided in the top area. The functional module 4k can be fully removed from the vehicle, so that said seat is located at the given fishing position and the angler or fisherman can sit on it.

In the embodiment according to FIG. 12 the functional module 4l is in the form of a reception case for a refrigerator, whose depth extends beyond the normal depth of the cavity available in the side walls for a functional module. Therefore the functional module 4l has a greater depth than the remaining functional modules. To conceal the projection of the fictional module 4l, it has a flexible screen material, which is connected in curtain or overhang manner with rear portions of the functional module 4l.

A functional module 4m according to FIG. 13 essentially corresponds to a dimensionally stable reception container, as shown in FIGS. 7 to 10. The essential difference in the case of functional module 4m is that at the front a fold-up, flexible pocket unit is provided, which in the embodiment shown accommodates three reception pockets. In the vicinity of the outsides of the side walls of the folding pockets are provided fixing means, which fix against one another in the folded up state the reception pocket walls. In the folded up state the pocket unit is integrated into a corresponding cavity within the functional module 4m. At the rear the pocket unit is firmly connected to the cavity and therefore to the functional module 4m.

What is claimed is:

1. A loading compartment of a motor vehicle with a loading compartment base, as well as two facing side walls, characterized in that at least one side wall (3) is provided with at least one detachable, dimensionally stable functional module (4a to 4m), which is held on a body side of the vehicle and which has an open or closed reception space for at least one functional part (5a to 5d), wherein the module is received within a complementary recess formed at least in part by the at least one side wall (3) and at least one bulkhead partition (9).

2. The loading compartment according to claim 1, characterized in that at least one end face of the functional module (4e) is provided with a panel, which is matched to the remaining panel surface of the loading compartment (1, 1a).

3. The loading compartment according to claim 1, characterized in that the functional module (4g) is designed as a container open to at least one side.

4. The loading compartment according to claim 1, characterized in that the functional module (4b) is designed as a closed, box-like container.

5. The loading compartment according to claim 1, characterized in that the functional module (4a) has at least one plug-in connection for the detachable connection to vehicle-fixed, electrical connecting leads (8).

6. The loading compartment according to claim 5, characterized in that on the loading compartment side is provided a corresponding linking junction (7), which in the installed state of the functional module (4a), forms a connector pair with the plug-in connection (6).

7. The loading compartment according to claim 1, characterized in that the functional module (4e) is fixed by means of a positively active, manually releasable holder in the loading compartment (1, 1a).

8. The loading compartment according to claim 1, characterized in that in the vicinity of a side wall (3) are provided at least two interconnected functional modules (4a to 4g) having aligned end faces directed towards the interior of the loading compartment.

9. The loading compartment according to claim 8, characterized in that on the body side there is at least one fixed bulkhead partition (9) extending in the vehicle transverse direction, which laterally flanks a functional module or is positioned between two adjacent functional modules.

10. The loading compartment according to claim 3, characterized in that the functional module (4g) which is designed as a container has at least one carrying handle (13a), which additionally constitutes a control element for a manually releasable holder (19, 20) of the container in the loading compartment.

11. A loading compartment of a motor vehicle with a loading compartment base, as well as two facing side walls, characterized in that at least one side wall (3) is provided with at least one dimensionally stable functional module (4a to 4m), which is held on a body side of the vehicle and which has an open or closed reception space for at least one functional part (5a to 5d), characterized in that on the functional module (4e) is provided at least one functional track (15) directed towards the interior of the loading compartment and which fulfils fixing, holding or contacting functions.

12. A loading compartment of a motor vehicle with a loading compartment base, as well as two facing side walls, characterized in that at least one side wall (3) is provided with at least one dimensionally stable functional module (4a to 4m), which is held on a body side of the vehicle and which has an open or closed reception space for at least one functional part (5a to 5d), characterized in that fixed to the vehicle and in the vicinity of at least one interior surface is provided at least one functional track, wherein the at least one functional track performs at least one of the following functions: flanks in bounding manner the at least one functional module: performs a fixing function: performs a holding function; performs a contacting function.

13. The loading compartment according to claim 11, characterized in that the functional tracks are preferably in the form of metal rail sections.

14. A loading compartment of a motor vehicle with a loading compartment base, as well as two facing side walls, characterized in that at least one side wall (3) is provided with at least one detachable, dimensionally stable functional module (4a to 4m), which is held on a body side of the vehicle and which has an open or closed reception space for at least one functional part (5a to 5d), and wherein the functional module (4e) is fixed by means of a positively active, manually releasable holder in the loading compartment (1, 1a), characterized in that the holder is constituted by a latching mechanism, comprising first fixing elements (11, 12) disposed on an interior surface of the loading compartment, and second fixing elements (17, 16) disposed on an outer surface of the functional module, and configured to be releasably received in the first fixing elements in a latching manner.

15. A loading compartment of a motor vehicle with a loading compartment base, as well as two facing side walls, characterized in that at least one side wall (3) is provided with at least one detachable, dimensionally stable functional module (4a to 4m), which is held on a body side of the vehicle, and which is configured to be received in a complementary formed recess along a side wall of the loading compartment, and which has an open or closed reception space for at least one functional part (5a to 5d)

characterized in that with the functional module is associated a restraining device (23), which keeps the functional module (4h) in a vehicle-fixed position in the case of vehicle impact stresses.

16. A loading compartment of a motor vehicle with a loading compartment base, as well as two facing side walls, characterized in that at least one side wall (3) is provided with at least one dimensionally stable functional module (4a to 4m), which is held on a body side of the vehicle and which has an open or closed reception space for at least one functional part (5a to 5d), and with a restraining device (23), which keeps the functional module (4h) in a vehicle-fixed position in the case of vehicle impact stresses, characterized in that the restraining device for the functional module has energy absorption means, which holds the functional module.

17. A functional module for a loading compartment according to claim 1, characterized in that a dimensionally stable component is provided and can be positioned in vehicle-fixed manner by means of a holder.

* * * * *